(12) United States Patent
Tarasinski et al.

(10) Patent No.: US 8,090,514 B2
(45) Date of Patent: Jan. 3, 2012

(54) VEHICLE CONTROL SYSTEM

(75) Inventors: Nicolai Tarasinski, Frankenthal (DE); Klaus Hahn, Mannheim (DE)

(73) Assignee: Deere & Company, Moline, IL (US)

( * ) Notice: Subject to any disclaimer, the term of this patent is extended or adjusted under 35 U.S.C. 154(b) by 621 days.

(21) Appl. No.: 12/135,343

(22) Filed: Jun. 9, 2008

(65) Prior Publication Data
US 2009/0018730 A1 Jan. 15, 2009

(30) Foreign Application Priority Data

Jul. 11, 2007 (DE) .................... 10 2007 032 310

(51) Int. Cl.
B60T 17/22 (2006.01)
B60T 7/04 (2006.01)
B60T 8/172 (2006.01)

(52) U.S. Cl. ........................ 701/70; 701/36
(58) Field of Classification Search ............... 701/1, 2, 701/35, 36, 71, 80, 82, 85, 86, 91–93, 96, 701/97, 70; 180/170, 171, 197; 340/438, 340/439
See application file for complete search history.

(56) References Cited

U.S. PATENT DOCUMENTS

| 4,640,475 | A | * | 2/1987 | Zoerb | 244/111 |
|---|---|---|---|---|---|
| 5,372,035 | A | * | 12/1994 | Ogawa et al. | 73/118.01 |
| 5,835,868 | A | * | 11/1998 | McElroy et al. | 701/2 |
| 6,549,841 | B1 | | 4/2003 | AxElsson | |
| 7,022,045 | B2 | * | 4/2006 | Yone | 477/120 |
| 7,480,562 | B2 | * | 1/2009 | Kustosch | 701/205 |
| 7,518,492 | B2 | * | 4/2009 | Grill et al. | 340/439 |
| 7,570,156 | B2 | * | 8/2009 | Cicilloni et al. | 340/435 |
| 7,603,228 | B2 | * | 10/2009 | Coughlin | 701/123 |
| 7,729,859 | B2 | * | 6/2010 | Kimura et al. | 701/301 |
| 7,798,578 | B2 | * | 9/2010 | Lewis et al. | 303/151 |
| 2006/0116807 | A1 | * | 6/2006 | Hijikata | 701/96 |
| 2007/0138863 | A1 | * | 6/2007 | Clark et al. | 303/125 |
| 2007/0198136 | A1 | * | 8/2007 | Kobayashi et al. | 701/1 |
| 2007/0213915 | A1 | * | 9/2007 | Tange et al. | 701/96 |
| 2007/0255481 | A1 | * | 11/2007 | Egawa et al. | 701/96 |
| 2009/0018723 | A1 | * | 1/2009 | Chevion et al. | 701/36 |
| 2009/0043467 | A1 | * | 2/2009 | Filev et al. | 701/57 |

FOREIGN PATENT DOCUMENTS

DE 199 04 626 8/2000
(Continued)

OTHER PUBLICATIONS

German Search Report received Aug. 30, 2010 (4 pages).

Primary Examiner — Mark Hellner
Assistant Examiner — Ari M Diacou

(57) ABSTRACT

A vehicle control system includes a pedal, such as an accelerator pedal, an adjusting device, a sensor and a control unit. The pedal may be actuated by the hand of an operator to set a state variable of the vehicle. The adjusting device applies a force to the pedal. A sensor senses a variable representing a state variable of the vehicle and transmits a sensor signal to the control unit. The control unit determines a state variable of the current operating state of the vehicle. The control unit, depending on the current operating state of the vehicle, controls the adjusting device so that a predetermined force is applied to the pedal, in order to make the operator aware of an unsafe operating condition.

18 Claims, 5 Drawing Sheets

FOREIGN PATENT DOCUMENTS

| | | |
|---|---|---|
| DE | 199 23 012 | 11/2000 |
| DE | 10026498 A1 | 11/2001 |
| DE | 10211946 C1 | 7/2003 |
| DE | 10235165 A1 | 2/2004 |
| DE | 602005005683 T2 | 4/2009 |
| EP | 0856432 | 8/1998 |
| EP | 1 777 094 | 3/2008 |
| FR | 2 828 155 | 2/2003 |

* cited by examiner

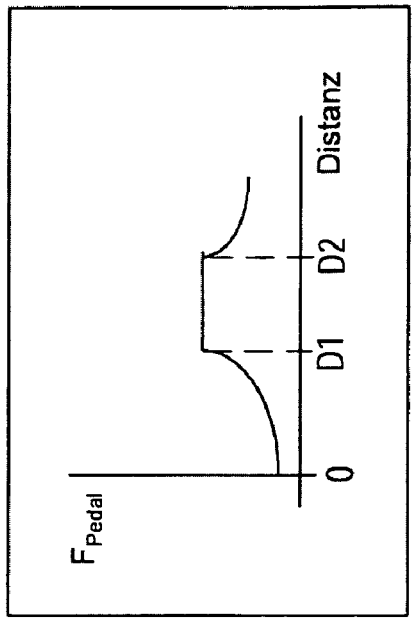
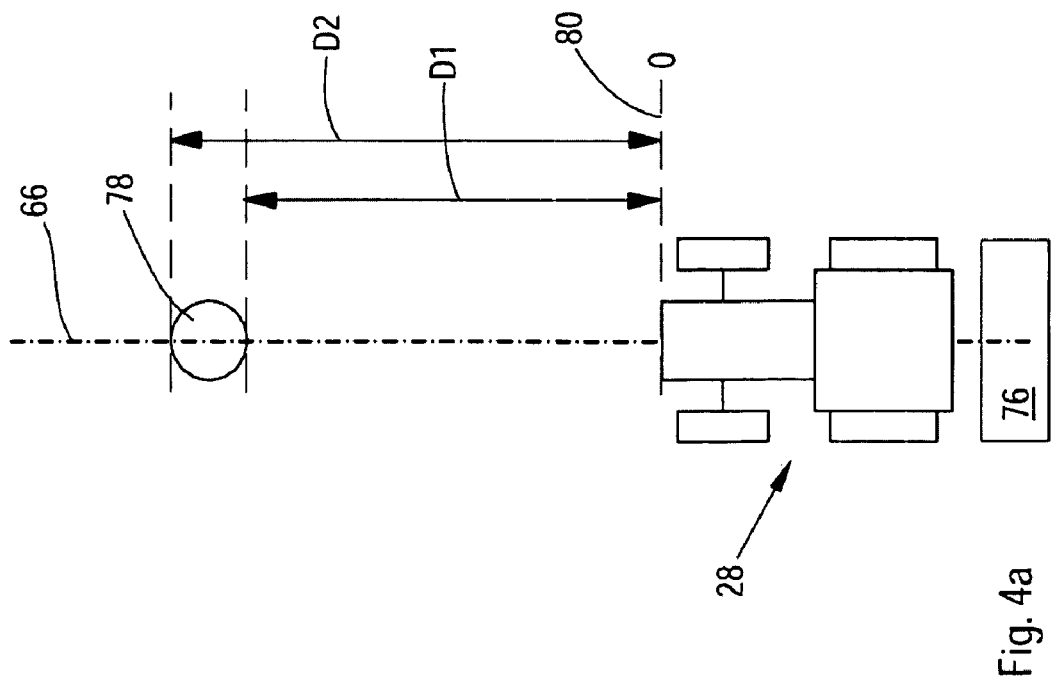

VEHICLE CONTROL SYSTEM

FIELD OF THE INVENTION

The present invention relates to a control system for a vehicle.

BACKGROUND OF THE INVENTION

There are many known control systems, such as for controlling and setting vehicle speed for an agricultural or industrial utility vehicle, such as tractors, harvesting machines, combine harvesters, forage harvesters, self-propelled sprayers, construction vehicles, bulldozers, graders, backhoe excavators, loading vehicles, tipper trucks, cranes and telescopic loaders.

Moreover, force-feedback is known from the field of simulator technology and is generally used for the realistic representation of forces on operating elements, which occur during the operation of a real machine and have to be applied and/or overcome by the operator. In this case, an adjusting device and/or an actuator is provided, by means of which at least one operating element may be acted upon by a force. As a result, the operating element which merely generates an electrical signal about its operating state, may be acted upon by the adjusting device with a corresponding force, so that the operating element has an operating characteristic which is conventional for the type of respective operating element.

In many vehicles, the operating elements are mechanically connected to a machine part. For example, the steering wheel is connected by a steering shaft to the steering gear. If such a mechanical connection is omitted due to an electronic control of the respective component, a corresponding feedback about the conditions of the machine part and the machine/vehicle to be simulated is not provided to the operator. In such a case, the technology known from simulator technology is utilized, namely by the operating element or pedal being acted upon by forces using an adjusting device, which is controlled by a suitable control unit, such that a conventional operating characteristic for the operating element may be produced. As a result, an operation of the respective function controlled by the operating element which is as realistic as possible is simulated to an operator.

Extensive assistance during the operation of a utility vehicle is, however, made known to the operator visually or possibly acoustically by warning display elements. In this case, primarily warning lights are provided which indicate a critical state of the utility vehicle, for example that of an excessive temperature of the engine oil or of the coolant above a predetermined upper threshold.

SUMMARY OF THE INVENTION

Accordingly, an object of this invention is to provide a system which assists a vehicle operator.

A further object of the invention is to provide such a system by means of which an operator is also made aware in an improved manner of an operating state of the utility vehicle which is critical or not optimal.

These and other objects are achieved by the present invention, wherein a control system includes a pedal, in particular an accelerator pedal, an adjusting device, a sensor and a control unit. The pedal may be actuated by a foot of an operator to set a state variable of vehicle. The adjusting device and/or an actuator applies a force to the pedal. The sensor senses a variable representing a state variable of the utility vehicle and transmits it to the control unit. The control unit determines a current operating state of the vehicle. The control unit, depending on the currently operating state of the vehicle, controls the adjusting device so that the pedal is acted upon by an altered predetermined force, in order to make the operator aware of a less than optimal operating state or operating function. The altered force could, for example, be a constant or variable force.

According to the invention, operation of the vehicle may be simplified and optimized if an operating state which is unsafe or not optimal is not displayed to the operator merely by visual display instruments. Conventionally, the vehicle has a tachometer for displaying the engine speed. If the engine is continuously operated at an increased speed which is above the maximum speed provided for continuous operation, with a conventional vehicle there is no further indication, apart from increased noise generation of the engine, which with a relatively well sound-insulated cab of the vehicle may not be perceived acoustically in all cases. This may lead to engine damage and thus to a longer period of the vehicle being out of operation and thus to high resulting costs. According to the invention, it is therefore provided that optionally the operator is made aware in a tactile manner of such an operating state of the vehicle via an acoustic and/or visual warning device. This is advantageous, in particular, when the operator as a result of the situation has to react immediately in any manner, in order for example to be able to prevent an overload of a component of the vehicle or an accident to the vehicle.

The control unit may calculate, using the sensor signal, in which direction and/or position the pedal might have to be moved, in order to achieve the desired purpose. The effects of adjusting a state variable are generally known. The position and/or the direction of displacement of the pedal, which might result in an optimal operating state, are determined. The adjusting device is controlled according to the result of a comparison between the calculated, advantageous direction of movement and/or position and the current direction of movement and/or position of the pedal.

Information about the position of the pedal—the current position detected by means of the pedal position sensor—is moreover preferably supplied to the control unit, which may be taken into consideration when calculating the desirable and/or undesirable direction of displacement and/or position of the pedal. In a few applications, however, it is not necessary to take into account the position of the pedal. It is also conceivable that the control unit derives information about the position of the pedal and/or the direction of movement thereof from the signal of the sensor and/or the alteration thereof.

The adjusting device may be operated in two different ways. On the one hand, it may generate a displacement resistance and/or an amplitude and/or frequency of the mechanical activation of the pedal, which is proportional to the difference between the current position of the pedal and a calculated, optimal position of the pedal. Or it may act on the pedal in a different manner, which depends on this difference in a manner which is continuous and preferably monotonically increasing. If the pedal poorly therefore, is poorly adjusted, it is very difficult to move it into an even more unfavorable position and/or it vibrates very strongly or rapidly. In the opposing direction, however, it may be easily moved and/or the vibrations reduce or disappear. On the other hand, there is the possibility that the adjusting device is only effective when the aforementioned difference exceeds a specific threshold value. In this case, the adjusting device may cause a displacement resistance increasing incrementally and/or the amplitude and/or frequency of the mechanical activation may be altered incrementally. The displacement resistance and/or the amplitude and/or frequency of the mechanical activation of the pedal therefore increases in this embodiment in at least one step. One advantage is in the easier technical implementation, as the adjusting device in the simplest case only has to be designed to be able to be switched on and switched off.

The control unit, depending on the current operating state of the vehicle, controls the adjusting device so that the pedal may be acted upon by an altered predetermined force, in order to make the operator aware of an unsafe operating state of the vehicle or an unsafe operating state of at least one operating function.

Preferably, by subjecting the pedal to a predetermined altered force, the operating characteristic of the pedal is varied. Thus, for example, the pedal could be acted upon by a force such that said steering wheel may be operated as a whole only by the application of increased force by the operator. In other words, within the scope of this embodiment, the force with which the pedal is acted upon by the adjusting device in a normal operating state of the vehicle, is increased by a constant value (offset), if an operating state of the vehicle is present which is not optimal or safe.

The pedal could be an accelerator pedal which sets the engine speed or the vehicle speed. Also, the pedal could be a brake pedal or a clutch pedal. In this case, the vehicle slowed by the brake pedal.

The sensor senses a variable which represents a state variable of the vehicle, such as the speed, the acceleration, the direction of travel, the currently set steering angle, the deviation from a predetermined direction of travel, the spatial position of the vehicle, the yaw movement or the yaw moment, the determination of an obstruction, the speed of an engine shaft or gear shaft, the speed of at least one wheel, the torque transmitted by a shaft, the torque output from a power plant, the performance or the capacity utilization of a power plant, the energy consumption or the fuel consumption of a consumer, the slippage of the vehicle on the ground, an axial load, the pressure or the volumetric flow or the volumetric flow alteration of a hydraulic fluid, the travel of a cylinder, the driving state, the motive force of the vehicle and/or the force of a trailer and/or of an implement acting on the vehicle. A force acting on the vehicle may, in particular, be a tractive force, a transverse force and/or a supporting force. The sensor could also detect the speed of an engine shaft or gear shaft, the speed of at least one wheel, the torque transmitted by a shaft, the torque output by a power plant, the performance or the capacity utilization of a power plant, the energy consumption or the fuel consumption of a consumer, the slippage of the vehicle on the ground, an axial load, the pressure or the volumetric flow or a volumetric flow alteration of a hydraulic fluid, the travel of a cylinder, the tractive force of a trailer and/or an implement acting on the vehicle, the driving state and/or the motive force of the vehicle. The sensor generates an electrical signal which represents the detected variable, which is transmitted to the control unit. The control unit, depending on the currently operating state of the vehicle, generates a signal and/or a signal sequence which controls the adjusting device.

The adjusting device comprises an actuator which is operated electrically, pneumatically or hydraulically, ad which applies a changeable and/or variable force to the pedal. The adjusting device could, moreover, comprise a further actuator such as a spring and which subjects the pedal to a constant force and/or to a constant force characteristic.

An optimal operating state of the vehicle is, in particular, present when the vehicle has a minimized fuel consumption and/or when the driving speed or the efficiency of the vehicle and/or individual components thereof is/are optimally adapted to the currently present operating mode of the vehicle. In other words, individual components and/or the entire vehicle is adjusted such that the efficiency thereof is optimized for the currently present operating mode of the vehicle and/or adapted thereto. A currently present operating mode could, for example, be plowing with a tractor, i.e. a plough being adapted to the tractor. In a further step, a different currently present operating state could refer to the sowing of plant seed, when a sowing machine is adapted to the tractor. An optimal operating state is also desired for the case in which the crops processed and/or treated by the vehicle and possibly by an implement adapted to the vehicle, have an optimal throughput or turnover. A tractor with a round baler adapted to the tractor could represent an example thereof. In an optimal operating state, the round baler is operated such that the hay received by the round baler is received at a maximum delivery speed (maximum throughput), without causing a blockage.

A safe operating state of the vehicle is, in particular, when the engine capacity utilization, the angle of the vehicle relative to the horizontal, the yaw moment, the counterweight of the vehicle with an implement possibly adapted thereto, the torque loading prevailing in the drive train and/or the speed of rotating components present in the drive train and/or the speed of the vehicle (also during cornering) do not exceed a correspondingly predetermined threshold value. Further safety-relevant parameters are, for example, also the aforementioned engine oil temperature, the temperature of the coolant of the internal combustion engine of the vehicle or the pressure of a hydraulic braking system. Accordingly, a safe operating state of the vehicle is present when the corresponding predetermined threshold values are not exceeded and/or fallen below. A safe operating state of the vehicle is also present when there is no obstruction in the driving area or the effective area of the vehicle. In other words, an unsafe operating state is present when the corresponding predetermined threshold values are exceeded or fallen below and/or when an obstruction is in the driving area or effective area of the vehicle.

With vehicle variables which may not be immediately noticed by the operator, the control system is helpful for an optimal and/or safe operation of the vehicle. This could primarily be relevant with trailers suspended on the vehicle (for example a spray with an extended spray bar), which for example due to ground unevenness may carry out rolling and/or yaw movements and thus move the unit consisting of the vehicle and the trailer into a dangerous overall state. The pedal (which sets the vehicle speed) could in such a case be acted upon by a force such that the operator is instructed to deflect the pedal to a lower speed of the unit.

The adjusting device could be activated by the control unit so that the adjusting device acts upon the pedal with a substantially constant force. Such a mode of operation could, in particular, refer to the state of the pedal in which said pedal is in the neutral position and not actuated by an operator.

Alternatively or additionally thereto, the adjusting device could act upon the pedal with a predetermined force path. The predetermined force path could, depending on the actuating path and/or the deflection of the pedal or the state variable to be controlled, have a constant analytical function. The analytical function could be temporally altered and thus take account of an altered operating state of the vehicle.

In particular, when the vehicle approaches an unsafe operating mode or the operator misuses an operating function or a vehicle function, the adjusting device could act on the pedal located in the neutral position or in any position, with a temporally variable force. This is useful, in particular, in operating states in which the respectively present state variable or the respectively present critical variable may not be immediately perceived by the operator. This could, for example, refer to the torque which in a tractor is transmitted via the power take-off shaft to an implement adapted to the tractor and which exceeds a predetermined threshold value. Accordingly, the pedal could be acted upon by the adjusting device with a temporally variable force such that the pedal undergoes a type of jolting movement and as a result makes the operator aware in a tactile manner of a critical operating state.

Preferably, the pedal is acted upon by a predetermined altered force if an operating state deviates from the optimal operating state.

This is, amongst others, the case when the currently present operating state and/or a currently present state variable of the vehicle or an operating function of the vehicle exceeds or falls below a predetermined threshold value. In this case, for example, it may be a pressure of a hydraulic fluid above a maximum value, with which a hydraulic cylinder of a loader may be controlled, the loader being able to be adapted to a tractor. Such a situation could, for example, indicate an overload when lifting the loading bucket.

The pedal could be acted upon by a predetermined altered force, if the speed of a shaft and/or the speed of a shaft of an implement deviates from a predetermined speed.

Also the pedal could be acted upon by a predetermined altered force if the speed of the vehicle deviates from a predetermined speed. If the vehicle exerts an operating function, which requires a forward movement of the vehicle at a substantially constant speed (for example sowing), by altering the force at which the pedal is acted upon, the operator could be made aware of this circumstance. Another application, in which the speed of the vehicle is to have a predefined value, is that of a tractor which drives next to a harvesting machine and has a trailer. Here, during the harvesting operation of the harvesting machine, the crop can be moved during driving onto a trailer which is pulled by the tractor. During this operation, the relative position between the harvesting machine and the tractor including the trailer should remain substantially unchanged. Accordingly, it can be signaled that the speed is to be reduced or increased to the operator of the tractor and/or the operator of the harvesting machine in a tactile manner via the respective pedal. Corresponding sensors are presupposed for determining the relative position between the harvesting machine and the tractor including the trailer.

The pedal may be acted upon by a predetermined, variable force, which depends on the nature of the road and/or the ground.

Preferably, the pedal may be acted upon in its neutral position by the adjusting device at least in a specific operating state of the vehicle by a predetermined high force. The pedal may be deflected from its neutral position by a single application of correspondingly high force by the operator, in order to transfer the vehicle and/or an operating function of the vehicle from a safe state into an operating state. Thus, a so-called force lock of the function controlled by the pedal may be achieved. The operator has to exert a relatively high force for controlling the function for the first time, in order to control the function at all. If the function is then controlled, it is proposed that the pedal is no longer subjected to the predetermined high force and/or that this is done again only if the pedal has not been actuated for a long period of time. In the same manner, an acknowledgement of the start-up of the vehicle or an acknowledgement of a switching for a gearbox switching operation could be implemented, i.e. the control actually desired by the operator is acknowledged by overcoming the high force.

Moreover, the pedal may be acted upon by a predetermined force in order to make the operator aware that an alteration of a state variable of the vehicle controlled by the pedal or an operating function has been set in the meantime. In a comparable manner, the pedal could be acted upon by a predetermined force in order to make the operator aware that a specific state of an implement adapted to the vehicle is present. This could, for example, be the case if an implement is attached and said implement only achieves its operating speed after a time delay. If this is present, the pedal could be acted upon by a force impulse.

Preferably, the level of force at which the pedal may be acted upon, may be individually set by the operator. As a result, for example, each operator is able to set and/or possibly store an individually adapted operating characteristic of the pedal. This allows an adjustment of the pedal characteristic adapted individually thereto and may thus avoid faulty operation and/or allow individual ergonomic operation.

Preferably, a predetermined operating characteristic may be marked on the pedal such that an operator may relocate a desired setting—possibly adjustable by the operator—a deflected position or a deflection range of the pedal. Such a desired setting could be a speed or a speed range for a particular application or a particular operating use of the vehicle.

In a comparable manner, an adjustable "stop" of the pedal could be provided which possibly may be predetermined and/or adjusted by the operator, which permits the location of a particular speed limit.

Preferably, the pedal may be acted upon by a force so that an operator avoids a disadvantageous adjusting range of an operating state of an operating function or state variable of the vehicle—for example the natural frequency of the tires at specific speeds. The natural frequency of the engine suspension (dependent on the engine speed) and/or the natural frequency of the vehicle body could also have an unfavourable adjustment range, and could therefore in a comparable manner signal to the operator by subjecting the pedal to a corresponding force to avoid this setting.

In a further embodiment, a pedal may be acted upon by a predetermined force which is substantially dependent on the state of a different operating element of the vehicle. As a result, for example, a mutual locking of a plurality of operating elements may be simulated or an incorrect operation of the vehicle avoided.

It could be provided that the force exerted by the adjusting device on the pedal may be overridden and/or switched off by the operator. An overriding of the force exerted on the pedal by the operator should generally be possible, as it is not only intended that the operator feels that he/she has control over the operation of the vehicle. In addition, for safety reasons, the vehicle is also intended to be able to be operated by the operator if the pedal is acted upon by an incorrect force. This could be the case if a sensor detects a variable in error or the detected variable is interpreted incorrectly, although the probability of this occurring is only low. To this extent, the possibility of overriding a force which is exerted on the pedal represents a comparable possibility which a vehicle operator has with a navigation unit. There too, the operator can decide whether he selects the route which is proposed by the navigation unit or another route.

In addition to subjecting the pedal to a predetermined force, a visual and/or acoustic signal could be generated. This is provided, in particular, if a safe operating state of the vehicle and/or an operating function is abandoned. In this case, for example, a light source could be activated, possibly with increasing light intensity with increasing degrees of danger. Additionally or alternatively, an acoustic signal in the form of a warning tone (possibly with increasing loudness) could be generated via a loudspeaker and brought to the attention of the operator. Thus it could be provided that an operator may be warned in a tactile and visual manner on the pedal as well as acoustically in the cab of a safety risk, preferably with respect to a function which is controlled by the pedal.

The vehicle could be a self-propelled working machine and/or a tractive machine in the field of agriculture, construction or forestry. In particular, the vehicle could be a tractor, a harvesting machine, a combine harvester, a forage harvester, a construction machine and/or a forestry machine. Accordingly, the function controlled by the pedal of the control system could be a vehicle or operating function characteristic of the respective vehicle.

BRIEF DESCRIPTION OF THE DRAWINGS

FIG. 4a is a top view of an agricultural vehicle which is driving towards an obstruction;

FIG. 4b is a diagram of the force exerted on the pedal depending on the distance to the obstruction.

DESCRIPTION OF THE PREFERRED EMBODIMENT

Figure 1:
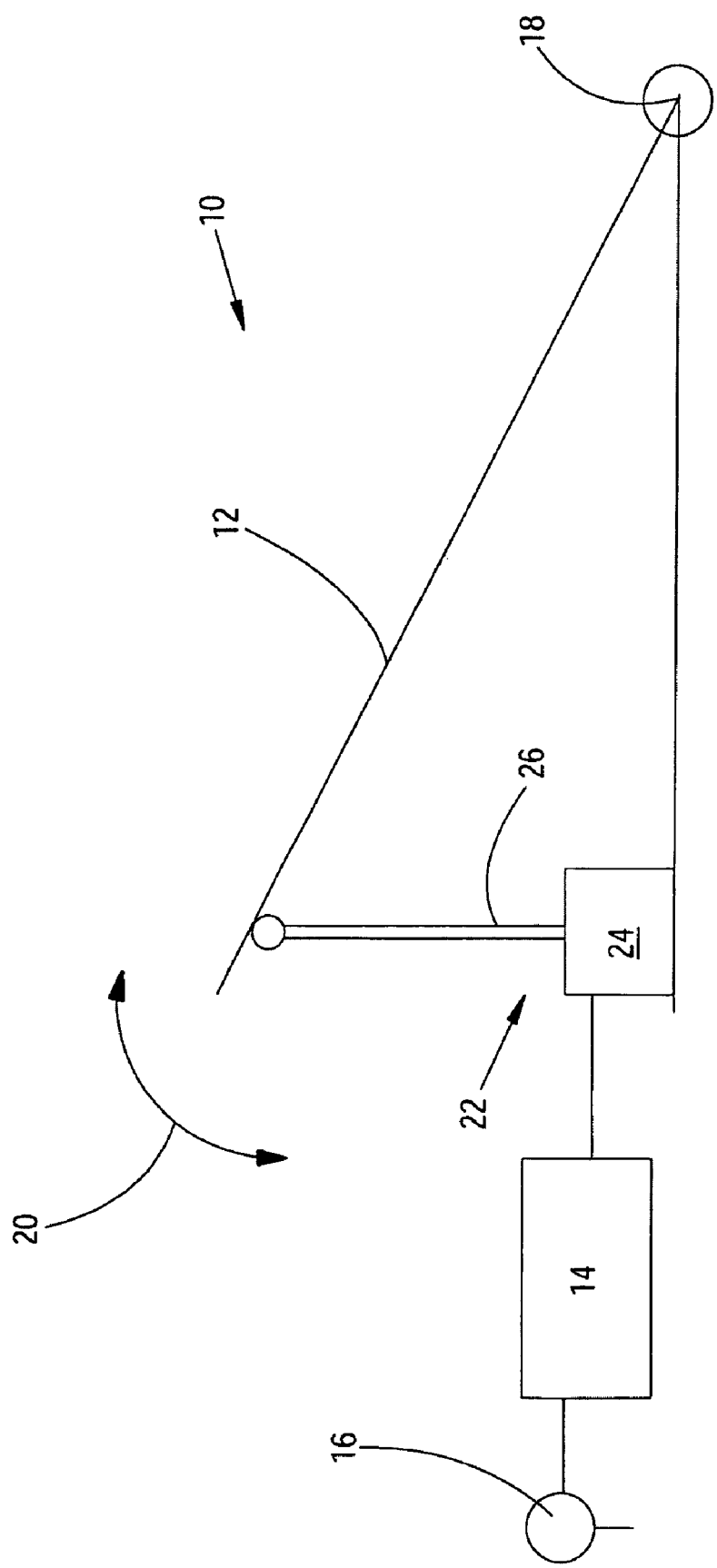
FIG. 1 is a schematic diagram of a control system according to the invention.

Referring to FIG. 1, the control system 10 has a pedal 12, a control unit 14 and a sensor 16. The pedal 12 is an accelerator pedal and may be pivoted about the axis 18 in the direction of the double arrow 20. The control system 10 controls the speed of the agricultural vehicle or tractor shown in FIG. 2. The control system 10 also includes an adjusting device 22, which comprises an actuator 24. The actuator 24 is electrically actuated and operates according to the moving coil principle. The actuator 24 moves the piston rod 26 upwards and downwards and loads rod 26 with force in both directions, so that the pedal 12 pivots about axis 18 in the direction of the double arrow 20. The piston rod 26 is pivotally connected to the pedal 12. The actuator 24 acts via the piston rod 26 on the pedal 12 with a compressive or tensile force. A sensor (not shown) on the actuator 24 senses the current position of the pedal 12 and transmits a sensor signal to the control unit 14. The sensor 16 detects the speed of the vehicle which is transmitted to the control unit 14.

The control unit 14, depending on the currently present state of the vehicle, controls the adjusting device 22 and thus the actuator 24 so that the pedal 12 may be acted upon by a predetermined altered force. As a result, an operating state of the vehicle and/or of the tractor which is not optimal or unsafe may be brought to the attention of the operator (not shown). Accordingly, by subjecting the pedal 12 to a predetermined altered force, the operating characteristic of the pedal 12 may be altered by the adjusting device 22.

Figure 2:
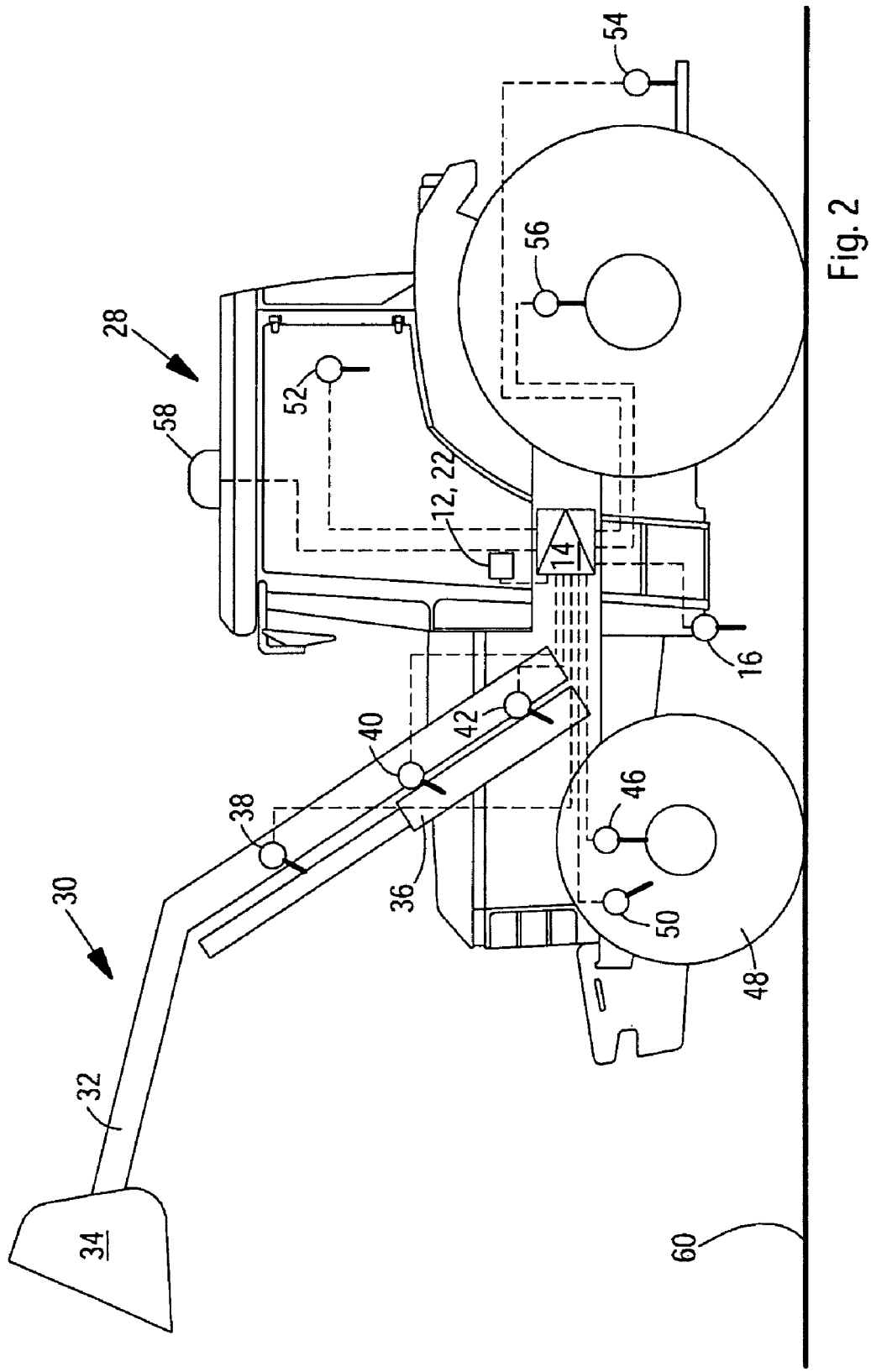
FIG. 2 is a simplified side view of an agricultural vehicle with an control system according to the invention.

FIG. 2 shows a tractor 28 which includes the control system 10. A front loader 30 is adapted to the tractor 28, which comprises an arm 32 and a loading bucket 34. The arm 32 of the front loader 30 may be raised and/or lowered by the dual-acting hydraulic cylinder 36.

A plurality of sensors are arranged on the tractor 28 and/or the front loader 30, not all sensors being required for carrying out the present invention. Thus, the travel of the piston rod of the hydraulic cylinder 36 may be determined by the sensor 38. Sensor 40 senses the alteration of the volumetric flow of the hydraulic fluid, which is supplied to the hydraulic cylinder 36 and/or which flows out of the hydraulic cylinder 36. Sensor 42 senses the pressure of the hydraulic fluid present in the piston chamber of the hydraulic cylinder 36. The sensor 16 detects the vehicle speed over the ground 60. Sensor 46 detects the speed of the left front wheel 48. Sensor (not shown) are also provided for the other three wheels. The sensor 50 detects the set steering angle of the front wheel 48. The sensor 52 detects the acceleration of the tractor 28. The sensor 54 detects the force which an implement (not shown) coupled to the tractor 28, applies to the tractor 28. Sensor 56 senses the torque transmitted to the rear drive unit. A GPS receiver 58 may be provided for receiving GPS position signals, from which the control unit 14 may detect the current position of the tractor 28. All sensors are connected to the control unit 14 by means of electrical cable connections. The adjusting device 22 is also connected with the actuator (not shown), to the control unit 14. Further sensors (not shown) may be provided with which further variables may be detected and from which a corresponding state variable of the vehicle or an operating function and/or from which a state variable of an implement adapted to the vehicle may be derived and/or determined.

Figure 3B:
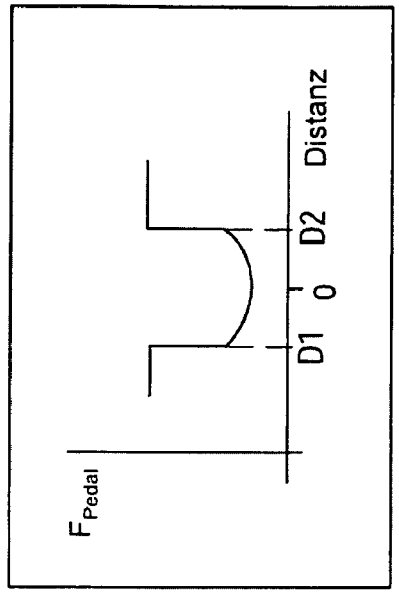
FIG. 3b is a diagram of the force exerted on the pedal depending on the relative position between the unit and the harvesting machine.
Figure 3A:
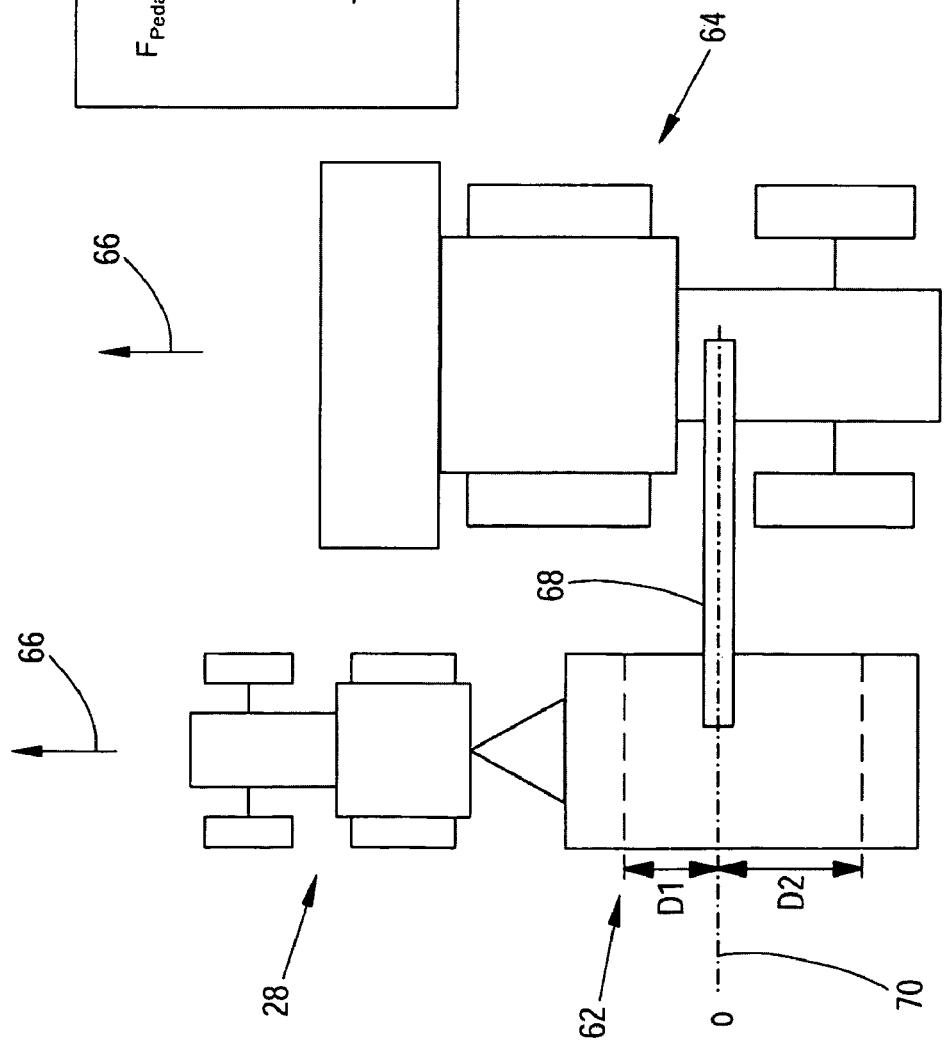
FIG. 3a is a top view of an agricultural vehicle and a trailer, which is driven adjacent to a harvesting machine.

FIG. 3a shows a unit consisting of a tractor 28 and a trailer 62. A harvesting machine 64 drives in the same direction (arrow 66) adjacent to the tractor 28. The harvesting machine 64 has a transfer device 68 with which harvested crops are moved into the trailer 62. In this transfer process, it is required that the relative position between the trailer 62 and the harvesting machine 64 remains substantially unaltered. Reference line 70 represents an ideal and/or predetermined relative position of the trailer 62 and the harvesting machine 64 have in the direction of travel 66. Thus, the speed of the tractor 28 has to be adapted to the speed of the harvesting machine 64. This process is assisted by the control system according to the invention. The control system is implemented in the tractor 28. Accordingly, the accelerator pedal of the tractor 28 is acted upon by a force, the characteristic curve thereof being shown in the diagram of FIG. 3b. In this diagram, the force exerted by the adjusting device on the accelerator pedal, depending on the distance of the position of the transfer device 68 is plotted relative to the reference line 70. FIG. 3a indicates a front and a rear distance D1, D2 with dashed lines, it being intended for the transfer device 68 not to be positioned beyond these dashed lines. The distances D1 and D2 are also depicted in the diagram according to FIG. 3b. As soon as the distance becomes smaller than D1 or greater than D2, a higher force is exerted on the accelerator pedal than is the case in the distance range between the distances D1 and D2. The force which is exerted on the accelerator pedal rises slightly or extremely monotonically within the distance range. Accordingly, a pedal setting region exists between D1 and D2, in which the operator has to apply a relatively small force for operating the accelerator pedal and thus is assisted when maintaining the speed of the harvesting machine 64. If the operator wishes to travel faster or slower, a greater force has to be exerted on the accelerator pedal.

In principle, a control system could also be provided in the harvesting machine 64, to control the speed of the harvesting machine 64 for an optimal harvesting application.

FIG. 4a shows a tractor 28 to which a baler 76 is adapted. The tractor 28 and baler 76 move along the direction of travel 66. Proceeding from the position of the unit shown in FIG. 4a, at the distance D1 an obstruction 78 is located, which could be a tree or a drain cover (not visible generally in the field). Information about obstructions or other events in the field of the operator could, for example, be input in a program implemented on a computer of the tractor which is coupled to a navigation system, in a map of the field. FIG. 4b shows in a diagram the force exerted on the accelerator pedal by the adjusting device depending on the distance with respect to the reference line 80, which identifies the position of the unit shown in FIG. 4a. Accordingly, the accelerator pedal is acted upon by the adjusting device at a decreasing distance with an increasing force, so that the operator might have to apply a greater force in order to increase or maintain the speed of the tractor 28. It is thereby finally signaled to the operator that he is moving towards the obstruction 78. Accordingly, he can avoid the obstacle 78 to the side, a constant force being exerted on the accelerator pedal in the range between D1 and D2. As soon as the tractor 28 with the baling press 76 has driven past the obstacle 78, the force which is exerted on the accelerator pedal by the adjusting device is reduced.

Figure 5:
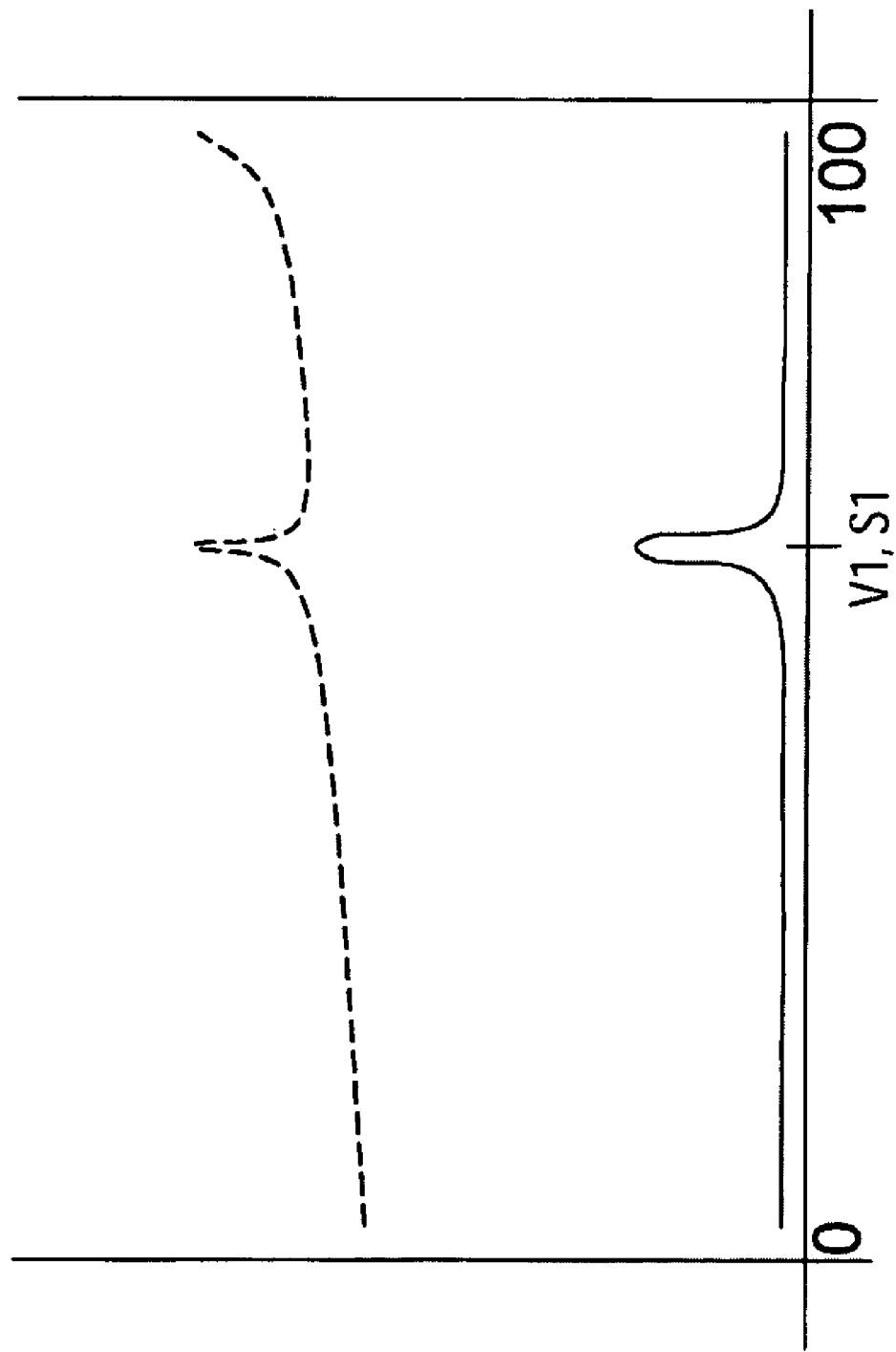
FIG. 5 is a diagram in which the vertical acceleration of the vehicle depending on the vehicle speed and the force exerted on the accelerator pedal by the adjusting device depending on the pedal travel are plotted.

In FIG. 5 the amplitude of the vertical acceleration (continuous line) of the vehicle is plotted as a function of the vehicle speed. The vehicle speed can vary between 0 and 100 percent of the maximum speed of the vehicle. Secondly (dashed line), the force which is exerted on the accelerator pedal by the adjusting device as a function of the pedal travel is likewise shown as a percentage. At the value 0, the accelerator pedal is in a non-actuated position. At the value 100, the accelerator pedal is situated in the fully deflected position, in which the maximum vehicle speed is requested. At the speed value V1, on account of the resonant frequency behavior of the vehicle chassis, a maximum vertical acceleration occurs which acts on the operator in the form of vibrations. Accordingly, it is expedient to avoid this speed value or range of the tractor 28. To this end, the accelerator pedal is loaded with a higher force by the adjusting device in the case of the pedal deflection or the pedal travel S1, at which the vehicle is at the speed V1. Accordingly, the driver will avoid this pedal deflection as a rule and therefore select a speed which is faster or slower than V1. As a result, what is known as the Bonanza effect can advantageously be avoided, in which namely a movement of the operator's foot can be caused on account of the vibrations of the tractor, the vehicle speed varies to a pronounced extent and the vehicle therefore oscillates.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A control system for a vehicle, comprising:
a pedal actuated by a foot of an operator to set a state variable of the vehicle;
an adjusting device for applying a force to the pedal;
a sensor for sensing a vehicle parameter and transmitting a parameter signal; and
a control unit for receiving the parameter signal, the control unit, depending on a sensed current operating state of the vehicle, controlling the adjusting device to apply a predetermined force to the pedal to make the operator aware of an unsafe or a non-optimal operating state of the vehicle, wherein the predetermined force is applied so that a displacement resistance is generated which is proportional to the difference between a current position of the pedal and a calculated optimal position of the pedal, the latter representing a safe or an optimal operating state of the vehicle.

2. The control system of claim 1, wherein:
the control unit, depending on the vehicle operating state, controls the adjusting device so that the pedal is acted upon by an altered predetermined force, so as to make the operator aware of an unsafe operating state.

3. The control system of claim 1, wherein:
applying a predetermined altered force to the pedal varies to an operating characteristic of the pedal.

4. The control system of claim 1, wherein:
the pedal is an accelerator pedal for setting a speed.

5. The control system of claim 1, wherein:
the pedal is a brake pedal.

6. The control system of claim 1, wherein:
the pedal is a clutch pedal.

7. The control system of claim 1, wherein:
the adjusting device comprising an actuator which may be actuated electrically.

8. The control system of claim 1, wherein:
the adjusting device acts upon the pedal with a predetermined force path, the force path depending on the actuation path of the pedal.

9. The control system of claim 1, wherein:
the adjusting device acts upon the pedal located in a neutral position.

10. The control system of claim 1, wherein:
the pedal is acted upon by a predetermined variable force, if current operating state differs from a predetermined threshold value.

11. The control system of claim 1, wherein:
the pedal is acted upon by a predetermined altered force, if a component speed deviates from a predetermined speed.

12. The control system of claim 1, wherein:
the pedal is acted upon by a predetermined altered force, if the speed of the vehicle deviates from a predetermined speed.

13. The control system of claim 1, wherein:
the pedal is acted upon by a predetermined variable force, which depends on the nature of a surface over which the vehicle travels.

14. The control system of claim 1, wherein:
a level of force applied to the pedal is individually settable by the operator.

15. The control system of claim 1, wherein:
the pedal is acted upon by a force so that an operator avoids a disadvantageous adjustment range of an operating state.

16. The control system of claim 1, wherein:
the pedal is acted upon by a predetermined force, which is substantially dependent on the state of a different operating element of the vehicle.

17. The control system of claim 1, wherein:
the force exerted by the adjusting device on the pedal can be overridden and/or switched off by the operator.

18. The control system of claim 1, wherein:
the control unit also generates a visual and/or acoustic signal.

* * * * *